(12) United States Patent
Miel et al.

(10) Patent No.: US 12,184,642 B2
(45) Date of Patent: Dec. 31, 2024

(54) PRIVACY PRESERVING ZERO KNOWLEDGE PROOF OF DEVICE CO-LOCATION

(71) Applicant: Cisco Technology, Inc., San Jose, CA (US)

(72) Inventors: Shayne Miel, Durham, NC (US); Richard Edward Harang, Alexandria, VA (US); Joshua Brian Lindauer, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 17/669,241

(22) Filed: Feb. 10, 2022

(65) Prior Publication Data

US 2023/0254305 A1     Aug. 10, 2023

(51) Int. Cl.
*H04W 12/65*     (2021.01)
*H04L 9/40*     (2022.01)
*H04W 12/30*     (2021.01)

(52) U.S. Cl.
CPC ...... *H04L 63/0853* (2013.01); *H04L 63/0492* (2013.01); *H04L 63/083* (2013.01); *H04L 63/0861* (2013.01); *H04L 63/105* (2013.01); *H04L 63/107* (2013.01); *H04W 12/30* (2021.01); *H04W 12/65* (2021.01)

(58) Field of Classification Search
CPC ............ H04L 63/0492; H04L 63/083; H04L 63/0853; H04L 63/0861; H04L 63/105; H04L 63/107; H04L 63/0876; H04W 12/30; H04W 12/65; H04W 12/06; H04W 12/63
USPC .......................................................... 455/411
See application file for complete search history.

(56) References Cited

U.S. PATENT DOCUMENTS

| | | | |
|---|---|---|---|
| 10,206,099 B1 | 2/2019 | Trinh et al. | |
| 11,632,366 B1* | 4/2023 | Shemesh | H04L 67/1004 726/3 |
| 2010/0318795 A1 | 12/2010 | Haddad et al. | |
| 2015/0087303 A1 | 3/2015 | Hillary et al. | |
| 2016/0006739 A1 | 1/2016 | Huang et al. | |
| 2016/0112367 A1 | 4/2016 | Thubert et al. | |
| 2019/0044952 A1* | 2/2019 | Jacobs | H04L 67/535 |
| 2022/0255929 A1* | 8/2022 | Rafferty | H04L 63/0876 |

OTHER PUBLICATIONS

A Privacy-Preserving Cross-domain Network access Services Using Sovrin Identifier; IEEE , 2021; Farooq Ahmed (Year: 2021).*

* cited by examiner

*Primary Examiner* — Hirdepal Singh
(74) *Attorney, Agent, or Firm* — Lee & Hayes, P.C.

(57) ABSTRACT

This disclosure describes techniques and mechanisms for authenticating user device(s) by ensuring that two user devices accessing the same online service are co-located, while protecting private information associated with a user's network landscape and/or Bluetooth device(s). The techniques may ensure that a second factor authentication device is in the same location as a first factor access device, and that a first factor access device is in the same location as it was during previous access attempts).

20 Claims, 8 Drawing Sheets

PRIVACY PRESERVING ZERO KNOWLEDGE PROOF OF DEVICE CO-LOCATION

TECHNICAL FIELD

The present disclosure relates generally to the field of computer networking, and more particularly to authenticating a device by determining location of a co-located device w privacy preserving zero knowledge proof of the co-located device.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Users may utilize networks when accessing an online service. In some cases, an online service may want to know a location of a user device, when the user is attempting to access the online service. For instance, when using two-factor authentication to verify that a user is who they claim to be, it may be useful for the online service to know that a second user device is in the same location as the first user device and/or that the first user device is in the same physical location as it was during previous login attempts.

Current techniques for identifying user device location include identifying IP-based geolocation or GPS-based geolocation. For instance, IP addresses may be used as a proxy for device geolocation, such as by looking up location values associated with the IP address in a database (e.g., such as MaxMind or Neustar). However, IP addresses only provide an approximate location that may not be accurate. For instance, a user may be on VPNs (users appearing to be in locations that they are not) and/or mobile networks (IP addresses that are not tied to the same network as the user's primary access device). Accordingly, an IP address is a poor proxy for a physical location, since user device(s) may be on VPNs or mobile networks. While GPS-based locations are more accurate, many users may not want to share their location information with the online service. Accordingly, there is a need for system(s) and method(s) to accurately determine locations) of user device(s), while maintaining privacy of the user.

Moreover, users and/or online services may be vulnerable to Push Fraud attacks, where a bad actor has stolen or obtained a user's first factor credentials (e.g., such as username and/or password) and spams the second device of the user's (e.g., such as a device where verification information and/or a second form of authentication is sent to) in order to get the user to accidentally accept a fraudulent request. Accordingly, there is a need for system(s) and method(s) of accurately determining locations) of a user device and a co-located user device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
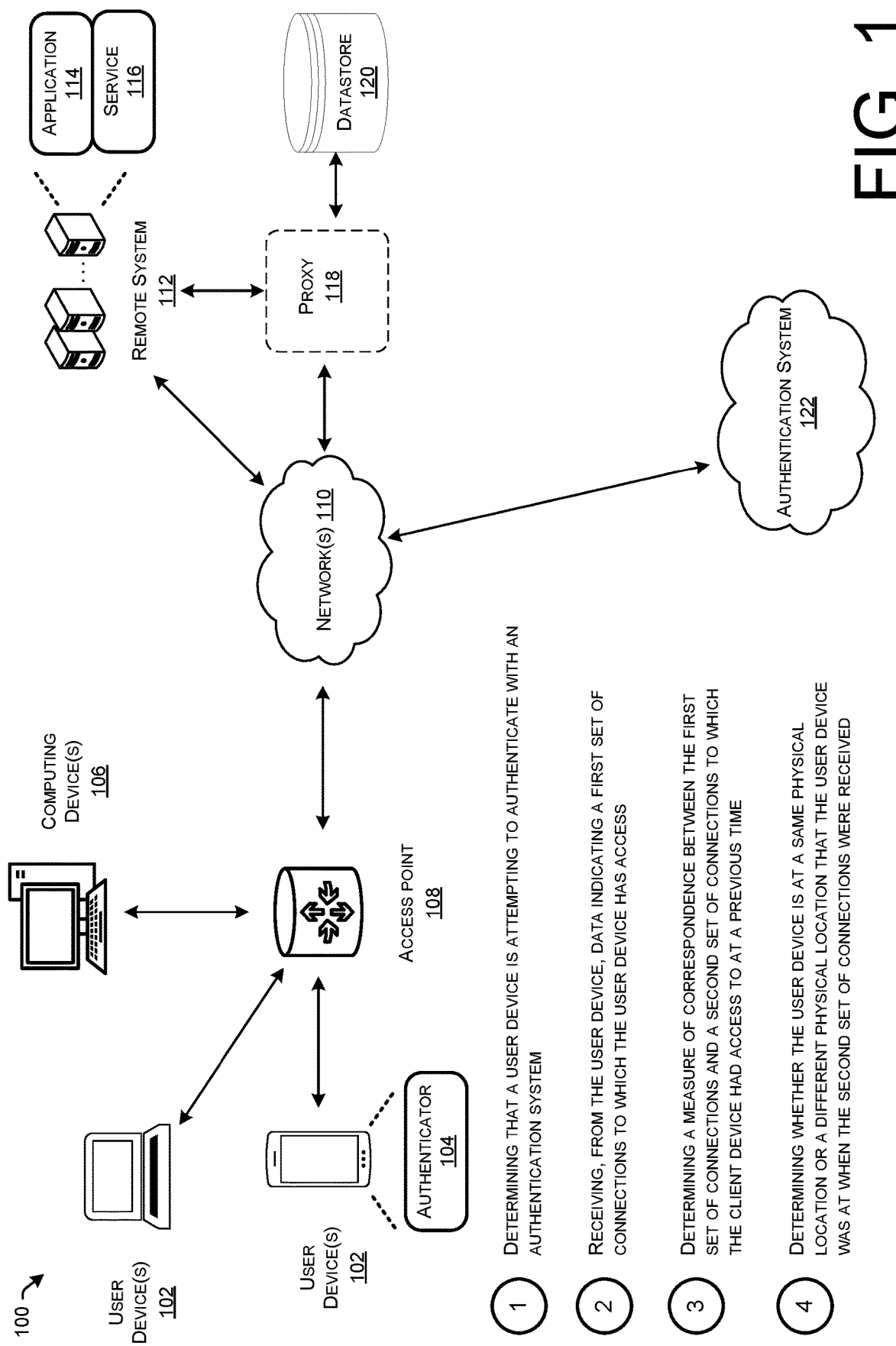
FIG. 1 illustrates a system-architecture diagram of an environment in which an authorization system can authenticate a user device while preserving privacy of the co-located device's location using a zero knowledge proof.

The present disclosure relates generally to the field of computer networking, and more particularly to authenticating a device by determining location of a co-located device with privacy preserving zero knowledge proof of the co-located device.

A method to perform techniques described herein may include determining that a user device is attempting to authenticate with an authentication system. Further, the techniques include receiving, from the user device, data indicating a first set of local area network (LAN) connections to which the user device has access. Additionally, the techniques include determining a measure of correspondence between the first set of LAN connections and a second set of LAN connections to which the user device had access to at a previous time. The techniques further include based on determining the measure of correspondence, determining whether the user device is at a same physical location or a different physical location than the user device was at when the second set of LAN connections were received.

Another method to perform techniques described herein may include determining that a user associated with a user device is performing an authentication with an authentication system. The techniques further include determining one or more local area network (LAN) connections to which the user device has access. Additionally, the techniques include generating location data that includes indications of the one or more LAN connections. The techniques also include sending the location data to the authentication system.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

EXAMPLE EMBODIMENTS

A computer network can include different nodes (e.g., network devices, client devices, sensors, and any other computing devices) interconnected by communication links and segments for sending data between end nodes. Many types of networks are available, including for example, local area networks (LANs), wide-area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Users may utilize networks when accessing an online service. In some cases, an online service may want to know a location of a user device, when the user is attempting to access the online service. For instance, when using two-factor authentication to verify that a user is who they claim to be, it may be useful for the online service to know that a second user device is in the same location as the first user device and/or that the first user device is in the same physical location as it was during previous login attempts.

Current techniques for identifying user device location include identifying IP-based geolocation or GPS-based geolocation. For instance, IP addresses may be used as a proxy for device geolocation, such as by looking up location values associated with the IP address in a database (e.g., such as MaxMind or Neustar). However, IP addresses only provide an approximate location that may not be accurate. For instance, a user may be on VPNs (users appearing to be in locations that they are not) and/or mobile networks (IP addresses that are not tied to the same network as the user's primary access device). Accordingly, an address is a poor proxy for a physical location, since user device(s) may be on VPNs or mobile networks. Moreover, GPS-based locations are more accurate, many users may not want to share their location information with the online service. Accordingly, there is a need for system(s) and method(s) to accurately determine location(s) of user device(s), while maintaining privacy of the user.

Moreover, users and/or online services may be vulnerable to Push Fraud attacks, where a bad actor has stolen or obtained a user's first factor credentials (e.g., such as username and/or password) and spams the second device of the user's (e.g., such as a device where verification information and/or a second form of authentication is sent to) in order to get the user to accidentally accept a fraudulent request. Accordingly, there is a need for system(s) and method(s) of accurately determining location(s) of a user device and a co-located user device.

This disclosure describes techniques and mechanisms for enabling an authentication system to authenticate a user device by determining location of the user device and/or a co-located user device while preserving privacy of the user device and/or co-located user device. In some examples, the authentication system may determine that a user device is attempting to authenticate with an authentication system. In some examples, the authentication system may receive, from the user device, data indicating a first set of local area network (LAN) connections to which the user device has access. In some examples, the authentication system may determine a measure of correspondence between the first set of LAN connections and a second set of LAN connections to which the user device had access to at a previous time. The authentication system may, based on determining the measure of correspondence, determine whether the user device is at a same physical location or a different physical location than the user device was at when the second set of LAN connections were received.

Additionally, this disclosure describes techniques and mechanisms for enabling a user device to authenticate with an authentication system while preserving privacy of the user device. In some examples, the user device may determine that a user associated with a user device is performing an authentication with an authentication system. In some examples, the user device may determine one or more local area network (LAN) connections to which the user device has access. In some examples, the user device may generate location data that includes indications of the one or more LAN connections and send the location data to the authentication system.

In some examples, the user device may identify available connection(s). For instance, in some examples, the user device may determine one or more LAN connections, PAN connections, and/or any other available wireless network connections. As described in greater detail below, the user device may hash, encrypt, and/or input each address of each identified wireless network into a filter (e.g., such as a Bloom filter). In some examples, location data may include data associated with the filter, output of the filter, etc. In some examples, the location data may include the hashed and/or encrypted addresses of each wireless connection.

In some examples, the authentication system may store location data associated with previous access attempts. For instance, the second set of LAN connections may correspond to a portion of location data associated with a previous authentication by the user device. As described in greater detail below, the authentication system may determine to measure of correspondence (e.g., overlap) between the first set of LAN connections and the second set of LAN connections to which the user device had access to at a previous time. For instance, the measure of correspondence may indicate an amount of overlap between the two sets of LAN connections.

In some examples, the authentication system may, based on determining that the measure of correspondence is above a threshold, determine that the user device is at a same physical location that the user device was at when the second set of LAN connections were received. In this example, the authentication system may determine whether to perform a step-down authentication, such that the authentication system may refrain from requesting a second form of authentication from the user of the user device. In some examples, the authentication system may grant authentication of the user device. In some examples, the authentication system may, based on determining that the measure of correspondence is below a threshold, determine that the user device is at a different physical location than the user device was at when the second set of LAN connections were received. In this example, the authentication system may determine that a second form of authentication is needed from the user and/or whether to perform a step-up authentication (e.g., such as performing a step by step authentication process with the user of the user device).

In this way, the authentication system can more accurately determine a location of a user device and/or a co-located user device. Moreover, the authentication system can more accurately determine that the user device and/or co-located user device is in a same location as previous access attempt(s). Accordingly, the techniques described herein not only improve determination of user device and/or co-located device(s) locations, but also preventing Push Fraud attacks, thereby improving security of the authentication system, user device, and online service. Moreover, the techniques described herein enable a user device to identify address(es) of available connection(s) (e.g., such as Bluetooth and wireless) and hash, encrypt, enter each address as input into filter(s), etc. Accordingly, by sending the addresses to the authentication system already hashed, encrypted, etc., the described techniques enable improved location determination of a user device and/or co-located user device, while protecting the privacy of user data.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 in which an authentication system 122 authenticates a user device by identifying co-located user device(s). For instance, the environment 100 may include user device(s) 102A and 102B. As illustrated, user device(s) 102 may include any computing device, such as a mobile device, a laptop, a computer, a tablet, or any Wi-Fi enabled device and/or any Bluetooth enabled device. In some examples, the user device(s) 102 may include an application, such as authenticator 104. For instance, the authenticator 104 may comprise an application configured to authenticate a user device 102. In some examples, the authenticator 104 may correspond to an application such as Duo Mobile, Duo Health, Duo Push, or any other application configured to determine a location of a user device and/or authenticate a user and/or user device. In some examples, user device 102A corresponds to a first user device that attempts to access a remote system 112 and user device 102B corresponds to a co-located user device that is configured to authenticate the access attempt (e.g., such as via two-factor authentication).

In some examples, the environment 100 may include computing device(s) 106. Computing device(s) 106 may include any type of computing device (e.g., computer, laptop, cell phone, tablet, or any WiFi enabled device) and/or any Bluetooth enabled device. In some examples, the computing device(s) 106 may be associated with user(s) different from the user of the user device(s) 102.

In some examples, the user device(s) 102 and/or computing device(s) 106 may communicate with a remote system 112 and/or authentication system 122 via network(s) 110. As illustrated, the user device(s) 102 and/or computing device(s) 106 may be connected to the network(s) 110 via an access point 108. In some examples, the access point 108 comprises a router, a switch, or any other type of device included in a network architecture. Network(s) 110 may comprise any combination of any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In some examples, a user device 102A may attempt to access an application 114 and/or a service 116 of a remote system 112. In some examples, the remote system 112 may include any website, server, or other remote application that a user may be required to input authentication information to access the application 114 and/or service 116. For instance, the user device 102A may provide login information to a website in order to access a service 116. As noted above, the remote system 112 may require a two-factor authentication. The remote system 112 may connect to the authentication system 122 to initiate secondary authentication of the user (e.g., such as via user device 102B and/or user device 102A). In some instances, the environment may include an authentication system 122. The authentication system 122 generally include, manage, or otherwise be associated with one or more applications or services utilized by users accessing network(s) 110. In some examples, the authentication system 122 may be associated with any type of computing device and be used for any purpose.

For instance, as noted above, the remote system 112 may connect to a proxy 118 of the authentication system 122. In some examples, the remote system 112 may send an authentication request to the proxy 118 of the authentication system 122. The proxy 118 may establish a connection to the authentication system 122, such as over a TCP port. The authentication system 122 may send a notification to the user device 102B and/or 102A (e.g., such as a push notification to the authenticator 104), to cause the display of a request for a second form of authentication on the user device 102A and/or 102B. The authentication system 122 may receive input from the user, such as the second form of authentication. The authentication system 122 may determine whether to grant or deny access to the service 116 or application 114 of the remote system 112 based on the received input.

In some examples, when the user device 102 attempts to access an application 114 or service 116 of the remote system 112, the authorization request may be sent to the authentication system 112. In some examples, the authorization request may be sent via the authenticator 104. In some examples, and as described in greater detail below, the user device 102A, 102B and/or authenticator 104 may identify one or more connection(s) (e.g., LAN, PAN, or other available WiFi connection(s), and/or available Bluetooth connection(s)) that are available to the user device 102. In some examples, the user device 102A, 102B and/or authenticator 104 collects the addresses of all available Bluetooth device(s) and/or addresses (e.g., access point(s), BSSIDs, MAC addresses, etc.) of all available wireless network(s). In some examples, the user device 102A, 102B and/or authenticator 104 may send data indicating the addresses to the authentication system 122. In some examples, the data may be included as part of the authentication request. In some examples, the data may be sent by a single user device, such as user device 102B. In some examples, user device(s) 102A and/or 102B may send the data to the authentication system 122.

In some examples, the user device(s) 102 and/or authenticator 104 may hash each of the addresses and constructs bit string(s) for each of the addresses. In some examples, each address may be hashed a plurality of times. Each bit string may be input into one or more filter(s) (e.g., such as a Bloom filter and/or a Mini-Lash filter, or any other suitable data structure). The user device(s) 102 and/or authenticator 104 may send the output and/or the filter(s) to the authentication system 122. In some examples, the output and/or the filter(s) may be included as part of the authentication request. In some examples, the user device(s) 102 and/or authenticator 104 may include additional data (e.g., user data, user device data, or any other suitable data) as part of the authentication request and/or when constructing bit string(s) for each of the addresses. For instance, encryption techniques may be used on the location data, such as combining the hashing of each address with a private key. Accordingly, by hashing each address and/or using additional data, the output of the filter(s), filter(s), and/or location data sent to the authentication system. In this example, the system prevents a bad actor (e.g., a party that intercepts the authentication request) from being able to decrypt the information (e.g., without the corresponding public key) and/or compare the information with location data from other devices and/or users, thereby improving security of the system.

In some examples, the authentication system 122 may store the data associated with the authentication request (including the output of the filter(s), the filter(s), and/or the data indicating the addresses). At "1", the authentication system 122 may determine that a user device 102 is attempting to authenticate with the authentication system 122. In some examples, the authentication system 122 may determine that the user device 102 is attempting to access an application 114 or service 116 provided by a remote system 112. In some examples, the authentication system 122 may determine that the user device 102 is attempting to authenticate based at least in part on receiving an authentication request from the user device 102. In some examples, the authentication system 122 may receive the authentication request from the remote system 112 and/or proxy 118. In some examples, the authentication request may include a username and/or password associated with a user. In some examples, the proxy 118 may access a datastore 120 to verify the username and/or password 120. In some examples, the authentication system 122 may determine that a first user device 102A is attempting to access the application 114 or service 116 of the remote system 112 and that a second user device 102B is attempting to authenticate with the authentication system.

At "2", the authentication system 122 may receive, from the user device, data indicating a first set of connections to which the user device 102 (e.g., 102A and/or 102B) has access. For instance, the user device 102A and/or 102B may identify one or more available connections. In some examples, the one or more available connections comprise any available wireless network(s). Additionally, or alternatively, the one or more connection(s) may comprise available Bluetooth connections.

At "3", the authentication system 122 may determine a measure of correspondence between the first set of connections and a second set of connections to which the user device 102A and/or 102B had access to at a previous time (e.g., such as previous time associated with a previous authentication request and/or access attempt). As noted above, the authentication system 122 may store the data associated with the authentication request (including the output of the filter(s) and/or the data indicating the addresses). In some examples, the authentication system 122 may compare the data associated with the authentication request with other data associated with previous access requests, to determine whether the user device 102A and/or 102B is accessing the remote system 112 from a known location, that the user device 102A is in a same location as user device 102B. For instance, the authentication system 122 may access other data (e.g., address(es), hashed address(es), output from filter(s) (e.g., such as Bloom filters, MinHash filters, or similar data structures), filter(s), encrypted address(es), etc.) associated with a previous authentication attempt and/or access attempt. In this example, a previous authentication attempt may be an instance where a user successfully completed a two-factor authentication from a particular location (e.g., such as their home) within a particular time period (e.g., such as the last 30 days, last week, etc.). The other data may indicate previous connection(s) (e.g., wireless and/or Bluetooth) that were available to the user device 102A and/or 102B when the previous request was received by the authentication system 122. The authentication system 122 may compare the data associated with a first set of connection(s) included in the authentication request with the other data associated with a second set of connection(s) included in the previous authentication request and/or access request.

For instance, in some examples, the data associated with the first set of connection(s) included in the authentication request may comprise a first Bloom filter and the other data may comprise a second Bloom filter associated with a previous authentication request. In this example, the authentication system 122 may generate three numbers: (i) A*—the approximate number of connection(s) included in the first Bloom filter; (ii) B*—the approximate number of connection(s) included in the output in the second Bloom filter; and (iii) C*—the approximate number of items in the intersection between the Bloom filters. In some examples, the authentication system 122 may take a ratio (e.g., such as a Jacquard similarity) between C* and min(A*, B*) to determine approximately how many of the available connection(s) (e.g., Bluetooth devices and/or wireless networks)

between the first set of connection(s) (e.g., associated with the current authentication request) and the second set of connection(s) (e.g., associated with the previous authentication request) are present in the intersection (e.g., overlap). In some examples, the overlap comprises a number that ranges between 0 and 1, such that low numbers indicate a low amount of overlap and "1" indicates a perfect (e.g., 100%) overlap.

At "4", the authentication system 122 may determine whether the user device 102A and/or 102B is at a same physical location or a different physical location that the user device 102A and/or 102B was at when the second set of connections were received. For instance, the authentication system 122 may determine that the overlap is greater than and/or equal to a threshold (e.g., such as 0.7 or any other suitable number). In this example, the authentication system 122 may determine that the user device 102A and/or 102B is at a same physical location as when the second set of connections was received. For instance, the authentication system 122 may determine that the user device 102A is at a known location, such as the home of the user. In this example, the authentication system 122 may determine that the user device 102A is attempting to authenticate from the same physical location as the when the second set of connection(s) were received (e.g., from the user's home or other known location). In some examples, the known location(s) may correspond to physical location(s) that the user has performed a two-factor authentication from within a particular time period (e.g., 30 days, 2 weeks, or any other suitable time period). In other examples, the authentication system 122 may determine that the overlap is less than a threshold (e.g., less than 0.5, or any other suitable number). In this example, the authentication system 122 may determine that the user device 102 is at a different physical location than the user device 102A and/or 102B was at when the second set of connections were received. For instance, the physical location associated with the second set of connections may correspond to a home of the user. In this example, the authentication system 122 may determine that the user device 102A and/or 102B is attempting to authenticate from a different physical location (e.g., such as a new location, a coffee shop, etc.). Accordingly, the authentication system 122 may determine that a second form of authentication (e.g., biometric authentication, image, password, pin, etc.) is needed from the user. Thus, the authentication system 122 may protect the privacy of users by receiving output(s) of filter(s) and/or hashes of addresses. Moreover, by determining whether the user device is in a different physical location, the authentication system 122 may prevent push fraud attacks and improve security of the user devices) 102.

Figure 2A:
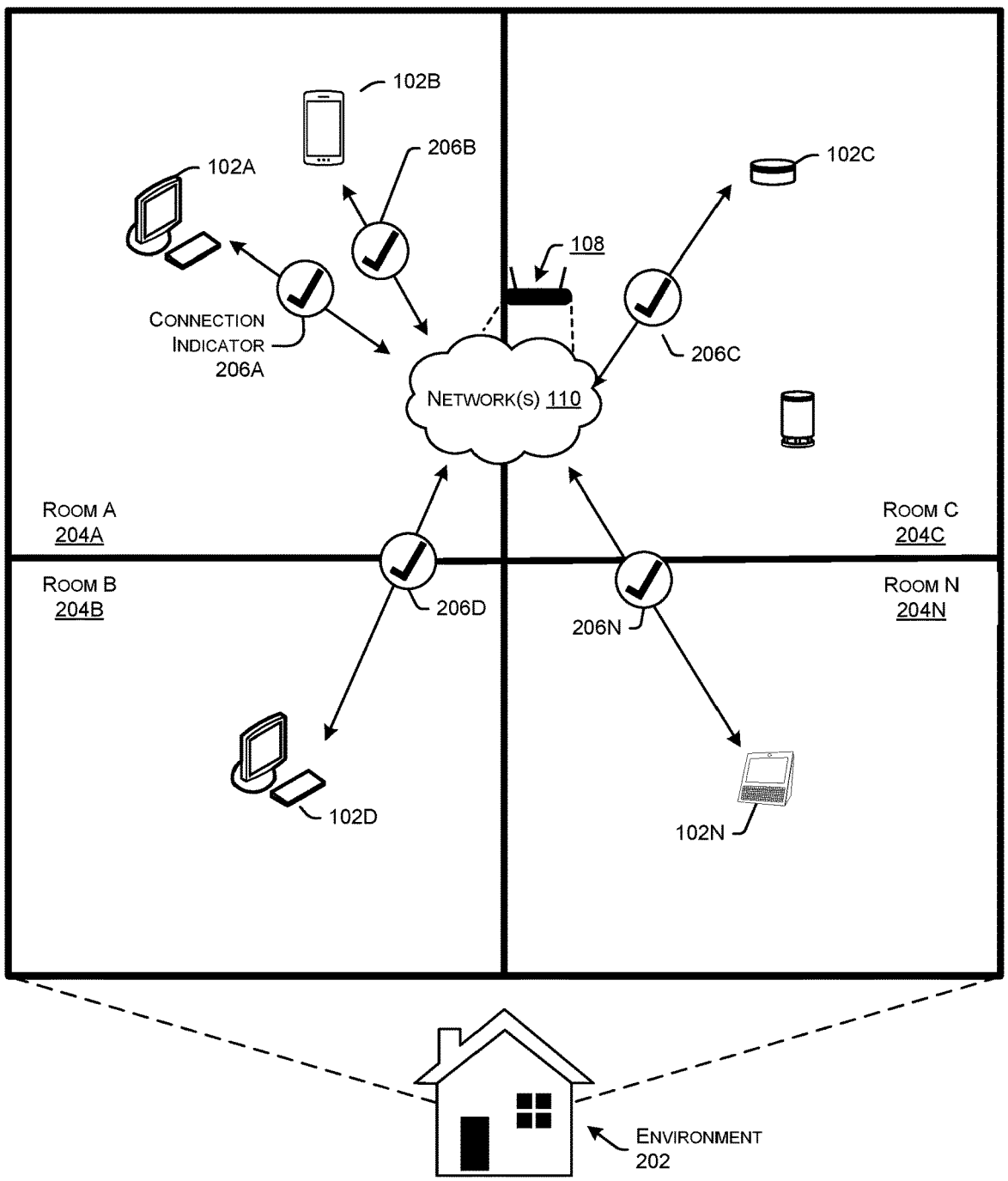
FIGS. 2A and 2B illustrate example environments for a device to authenticate with the authentication system of FIG. 1, according to some embodiments.
Figure 2B:
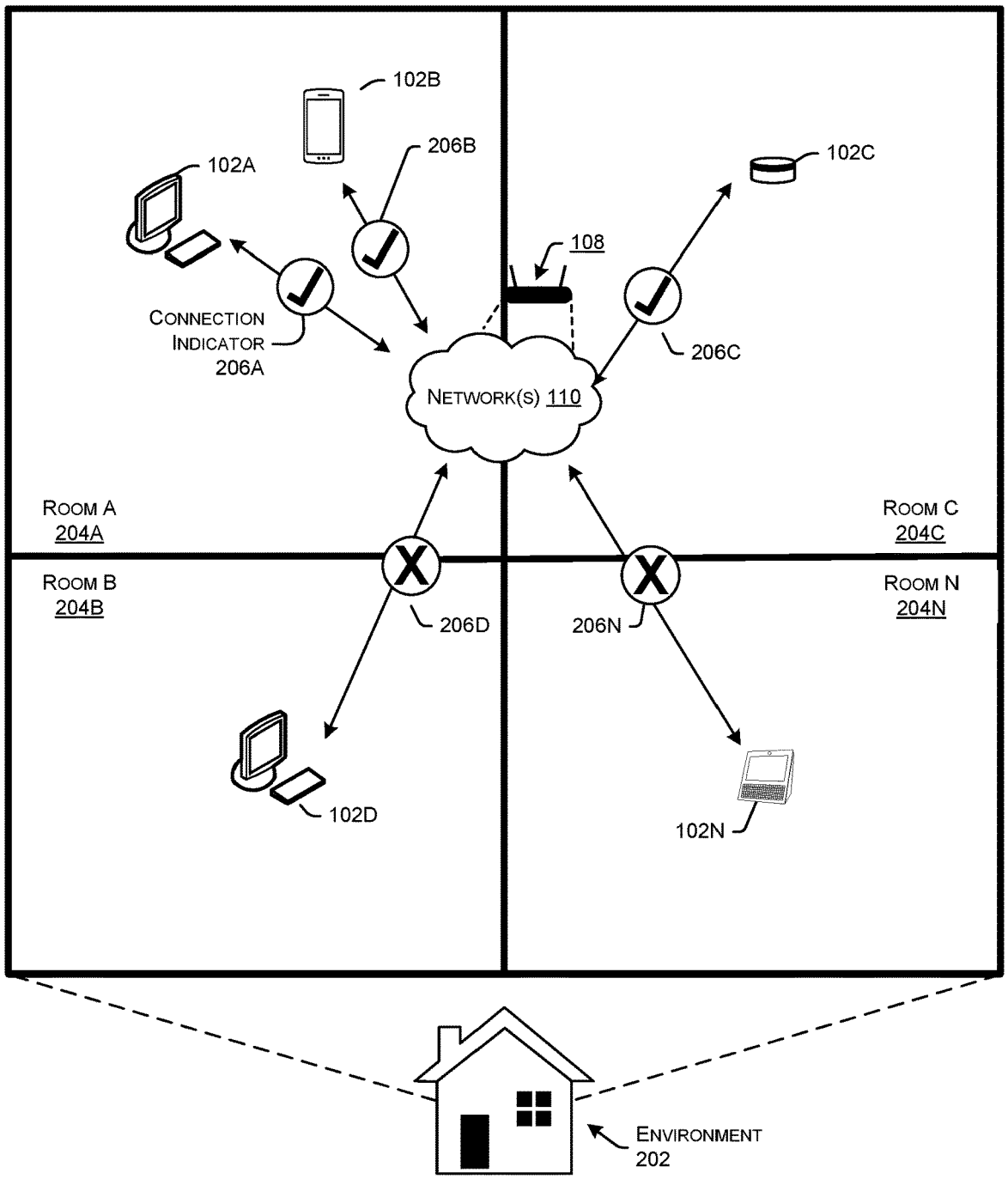

FIGS. 2A and 2B illustrate example environments for a device to authenticate with the authentication system 122 of FIG. 1, according to some embodiments. As illustrated in FIG. 2A, a user device 102 may be located within environment 202. In some examples, environment 202 may be associated with a user's home. The user may attempt to authenticate with an authentication system 122 via network(s) 110. For instance, the user may attempt to authenticate using the authenticator 104 described above. As illustrated, the user device 102 may identify connection(s). In the illustrative example, the connection(s) comprise PAN(s) 208A, 208B, and 208N. As illustrated in FIG. 2A, the available connection indicator(s) 206A, 206B, 206N may identify connection(s) that are available to the user device 102. For instance, connection 206A to PAN(s) 208A may be associated with one or more access points) 108A at Location 204A. Location 204A may correspond to a house, townhome, apartment, etc. Similarly, connections 206B to PAN(s) 208B and 206N to PAN(s) 208N may be associated with one or more access point(s) 108B and 108N at additional respective location(s) 204B and 204N (e.g., such as other houses, townhomes, etc.) to which the user device 102 may have access. For instance, the user device 102 may be able to connect and/or attempt to authenticate with any of PAN(s) 208A, 208B, and/or 208N. As illustrated, the user device may send a list of available connection(s) 210 to the authentication system 122 via network(s) 110. In some examples, the list of available connection(s) 210 may be included as part of the authentication request. In the illustrative example, the list of available connection(s) 210 may include addresses indicative of the location(s) (e.g., illustrated as "User A," "User B", and User N). In some examples, the list of available connection(s) 210 may include an indication of the number of available connections associated with each location. For instance, in FIG. 2A, user A (e.g., Location A) is associated with 4 available connections (e.g., indicating that there are 4 PAN(s) 208 available for the user device to connect to at location 204A). While the illustrated example of the list of available connection(s) 210 is shown in plain text, as described above, the addresses included in the list of available connection(s) 210 may be hashed and/or input into filter(s) (such as a Bloom filter). In this example, list of available connection(s) 210 may comprise one of the output(s) of the filter(s), the filter(s), and/or hashes of the addresses. In some examples, the addresses and/or number of connections may be encrypted (e.g., using any appropriate encryption technique, such as using a symmetric key and public key authentication schemes, etc.), such that the list of available connection(s) 210 comprises an encrypted list. As noted above, the authentication system 122 may receive and store the list of available connection(s) 210. In some examples, the list of available connection(s) 210 may correspond to a first set of available connection(s).

FIG. 2B illustrates an example environment 212 that is different from environment 202 of FIG. 2A. For instance, the environment 212 may correspond to a coffee shop or other store. In some examples, a user of the user device 102 attempts to authenticate from the environment 212. As noted above, the user device and/or authenticator 104 may identify connection(s) to which the user device has access. In the illustrative example, the user device and/or authenticator 104 identifies PAN(s) 216A, 216B, and 216N as being available (e.g., indicated by items 206A, 206B, and 206N) to the user device 102. As illustrated, PAN(s) 216A may be associated with access point(s) 108A at location 214A (e.g., such as another store), PAN(s) 216B may be associated with access point(s) 108B at location 214B (e.g., such as a building), and PAN(s) 216N may be associated with access point(s) 108N at location 214N (such as another store). As described above, the user device 102 and/or authenticator 104 may send a list of available connection(s) 218 to the authentication system 122. In some examples, the list of available connection(s) 218 may be included as part of the authentication request and may correspond to a second set of connection(s). In the illustrative example, the list of available connection(s) 218 may include addresses indicative of the access point(s) 108 and/or BSSIDs of the PAN(s) (e.g., illustrated as "Company A," "Building B", and "Company N"). In some examples, the list of available connection(s) 218 may include an indication of the number of available connections associated with each location. For instance, in FIG. 2B, Company A (e.g., Location A 214A) is associated with 1 available connection (e.g., indicating that there is 1 access point and/or PAN(s) 216 available for the user device 102 to connect to). While the illustrated example of the list of available connection(s) 218 is shown in plain text, as described above, the addresses included in the list of available connection(s) 218 may be hashed and/or input into filter(s) (such as a Bloom filter). In this example, list of available connection(s) 218 may comprise one of the output(s) of the filter(s), the filter(s), and/or hashes of the addresses. In some examples, the addresses and/or number of connections may be encrypted, such that the list of available connection(s) 218 comprises an encrypted list.

As described above, the authentication system 122 may receive the list of available connection(s) 218 (e.g., a second set of available connections) and may determine whether the user device 102 is attempting to authenticate from a different physical location than when the first set of connections (e.g., list of available connection(s) 210 in FIG. 2A) was received. As described above, the authentication system 122 may determine approximately how many of the list of available connection(s) 218 and the first set of connection(s) 210 overlap. As noted above, the overlap comprises a number that ranges between 0 and 1, such that low numbers indicate a low amount of overlap and "1" indicates a perfect (e.g., 100%) overlap. In the illustrative example, the authentication system 122 may determine that the overlap is below a threshold level, such that the user device 102 is in a different physical location (e.g., environment 212) than the user device 102 was at when the first set of connections 210 was received. Accordingly, the authentication system 122 may deny authentication of the user device, determine a second form of authentication is needed from a user of the user device, or any other appropriate action.

Figure 3A:
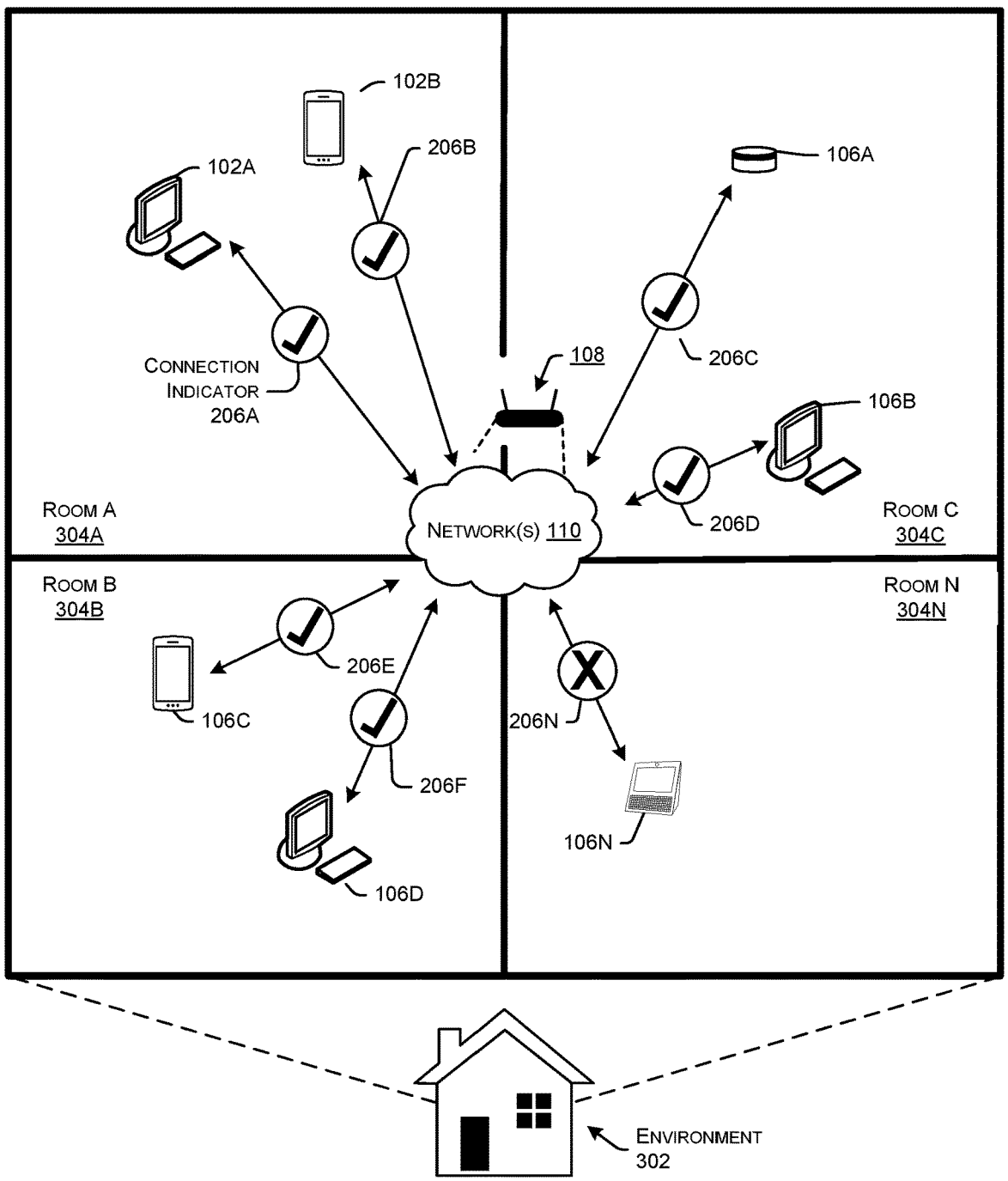
FIGS. 3A and 3B illustrate example environments for a device to authenticate with the authentication system of FIG. 1, according to some embodiments.
Figure 3B:
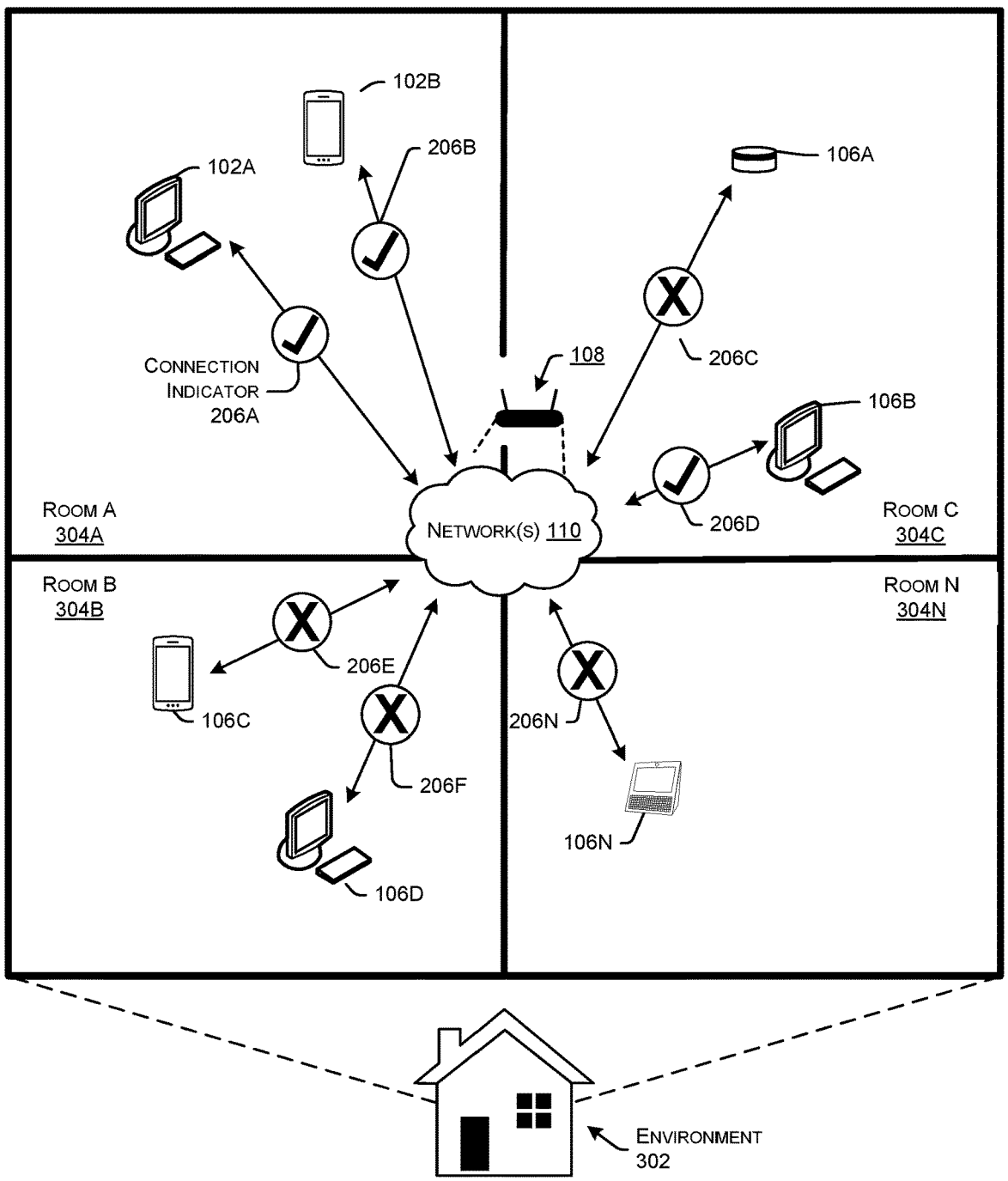

FIGS. 3A and 3B illustrate example environments for a device to authenticate with the authentication system 122 of FIG. 1, according to some embodiments. As illustrated in FIG. 3A, a user device 102A may be located within environment 302. In some examples, environment 302 may be associated with a user's home. The user may attempt to authenticate with an authentication system 122 via network(s) 110. For instance, the user may attempt to authenticate using the authenticator 104 described above. As illustrated, the user device 102 may identify connection(s) available to the user device 102A. In the illustrative example, the connection(s) comprise Bluetooth connection(s) with other user device(s) 102 within the user's home 302. As illustrated in FIG. 3A, the available connection indicator(s) 304A, 304B, 304C may identify the Bluetooth connection(s) that are available to the user device 102A. As illustrated, the user device 102A may send a list of available connection(s) 306 to the authentication system 122 via network(s) 110. In some examples, the list of available connection(s) 306 may be included as part of the authentication request. In the illustrative example, the list of available connection(s) 306 may include Bluetooth addresses associated with user device(s) 102B, 102C, 102D. In some examples, the list of available connection(s) 306 may include an indication of the number of available connections associated with each of user device(s) 102B, 102C, 102D. For instance, user device 102B may be associated with 1 available Bluetooth connection. While the illustrated example of the list of available connection(s) 306 is shown in plain text, as described above, the addresses included in the list of available connection(s) 306 may be hashed and/or input into filter(s) (such as a Bloom filter). In this example, list of available connection(s) 306 may comprise one of the output(s) of the filter(s), the filter(s), and/or hashes of the addresses. In some examples, the addresses and/or number of connections may be encrypted, such that the list of available connection(s) 306 comprises an encrypted list. As noted above, the authentication system 122 may receive and store the list of available connection(s) 306. In some examples, the list of available connection(s) 306 may correspond to a first set of available connection(s).

FIG. 3B illustrates an example environment 308 that is different from environment 302 of FIG. 3A. For instance, the environment 308 may correspond to a coffee shop or other store. In some examples, a user of the user device 102 attempts to authenticate from the environment 308. As noted above, the user device and/or authenticator 104 may identify connection(s) to which the user device 102 has access. In the illustrative example, the user device 102 and/or authenticator 104 identifies computing device(s) 106 as being available for the user device 102 to connect to (e.g., such as via Bluetooth). As described above, the user device 102 and/or authenticator 104 may send a list of available connection(s) 310 to the authentication system 122. In some examples, the list of available connection(s) 310 may be included as part of the authentication request and may correspond to a second set of connection(s). In the illustrative example, the list of available connection(s) 310 may include Bluetooth addresses of computing device(s) 106 that are available for the user device 102 to connect to. While the illustrated example of the list of available connection(s) 310 is shown in plain text, as described above, the addresses included in the list of available connection(s) 310 may be hashed and/or input into filter(s) (such as a Bloom filter). In this example, list of available connection(s) 310 may comprise one of the output(s) of the filter(s), the filter(s), and/or hashes of the addresses. In some examples, the addresses and/or number of connections may be encrypted, such that the list of available connection(s) 310 comprises an encrypted list.

As described above, the authentication system 122 may receive the list of available connection(s) 310 (e.g., a second set of available connections) and may determine whether the user device 102 is attempting to authenticate from a different physical location than when the first set of connections (e.g., list of available connection(s) 306 in FIG. 3A) was received. As described above, the authentication system 122 may determine approximately how many of the list of available connection(s) 310 and the first set of connection(s) 306 overlap. As noted above, the overlap may comprise a number that ranges between 0 and 1, such that low numbers indicate a low amount of overlap and "1" indicates a perfect (e.g., 100%) overlap. In the illustrative example, the authentication system 122 may determine that the overlap is below a threshold level, such that, the environment 308 of the user device 102 is a different physical location than the environment 302 the user device 102 was at when the first set of connections 306 was received. Accordingly, the authentication system 122 may deny authentication of the user device, determine a second form of authentication is needed from a user of the user device, or any other appropriate action.

Figure 4:
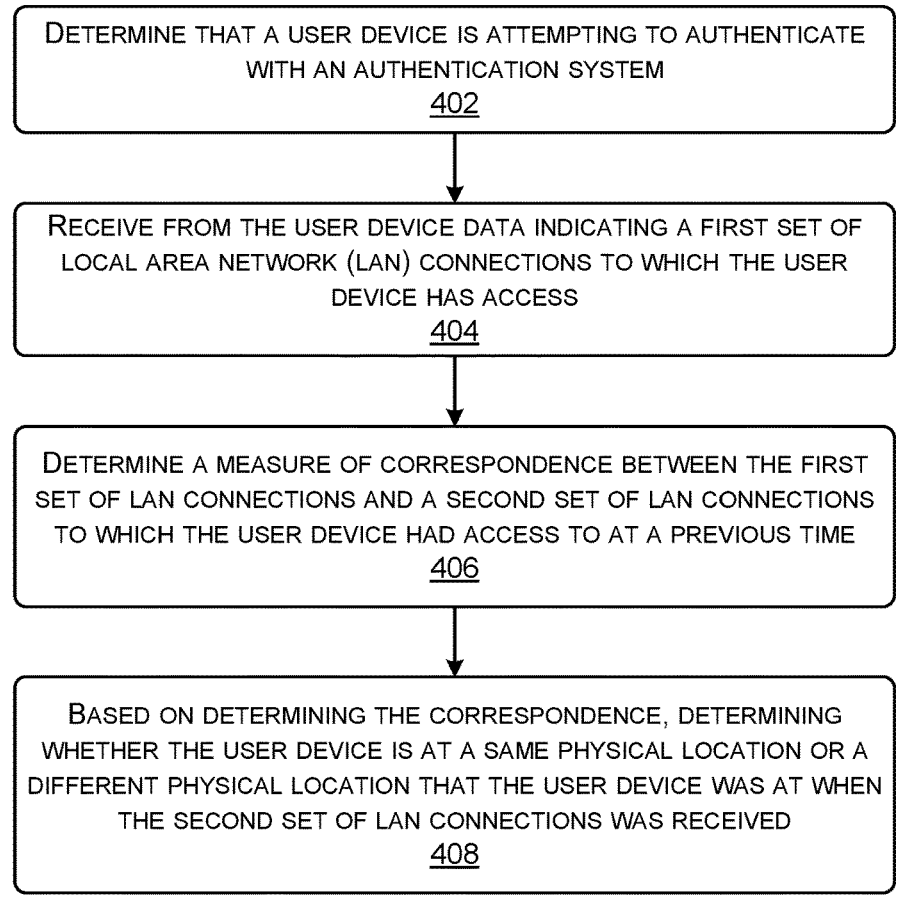
FIG. 4 illustrates a flow diagram of an example method for an authentication system to authenticate a user device with privacy preserving zero knowledge proof of device co-location.

FIG. 4 illustrates a flow diagram of an example method 400 for an authentication system to authenticate a user device with privacy preserving zero proof of device co-location. In some instances, the steps of method 400 may be performed by a device (e.g., authentication system 122) that includes one or more processors and one or more non-transitory computer-readable media storing computer-executable instructions that, when executed by the one or more processors, cause the one or more processors to perform operations of method 400.

At 402, the authentication system 122 may determine that a user device is attempting to authenticate with the authentication system. For instance, the user device may comprise a user device 102 described above. As noted above, in some examples, the authentication system 122 may determine that the user device 102 is attempting to access an application 114 or service 116 provided by a remote system 112. In some examples, the authentication system 122 may determine that the user device 102 is attempting to authenticate based at least in part on receiving an authentication request from the user device 102. In some examples, the authentication system 122 may receive the authentication request from the remote system 112 and/or proxy 118. In some examples, the authentication request may include a username and/or password associated with a user. In some examples, the proxy 118 may access a datastore 120 to verify the username and/or password 120.

At 404, the authentication system 122 may receive, from the user device, data indicating a first set of local area network (LAN) connections to which the user device has access. As noted above, the data may include the list of available connection(s) described in FIGS. 2A, 2B, 3A, and 3B above. As noted above, the data may comprise hashed addresses, filter(s), output of the filter(s), etc. In some examples, the data may be included as part of a request for authentication received by the authentication system 122.

At 406, the authentication system 122 may determine a measure of correspondence between the first set of LAN connections and a second set of LAN connections to which the user device had access to at a previous time. In some examples, the measure of correspondence comprises the overlap described above.

At 408, the authentication system 122 may, based on determining the measure of correspondence, determine whether the user device is at a same physical location or a different physical location than the user device was at when the second set of LAN connections were received. In some examples, such as where the authentication system 122 determines that the measure of correspondence is below a threshold, the authentication system 122 may determining that the user device is at the different physical location and one of deny authentication of the user device or prompt a second user device to perform a second form of authentication. For instance, in some examples, the second user device may comprise a mobile device of a user that is co-located with the user device. In some examples, the second form of authentication comprises a biometric authentication. In some examples, such as where the authentication system 122 determines that the measure of correspondence is above a threshold, the authentication system may determine that the user device is in the same physical location and one of grant authentication of the user device and/or refrain from prompting a user of the user device to perform a second form of authentication.

Figure 5:
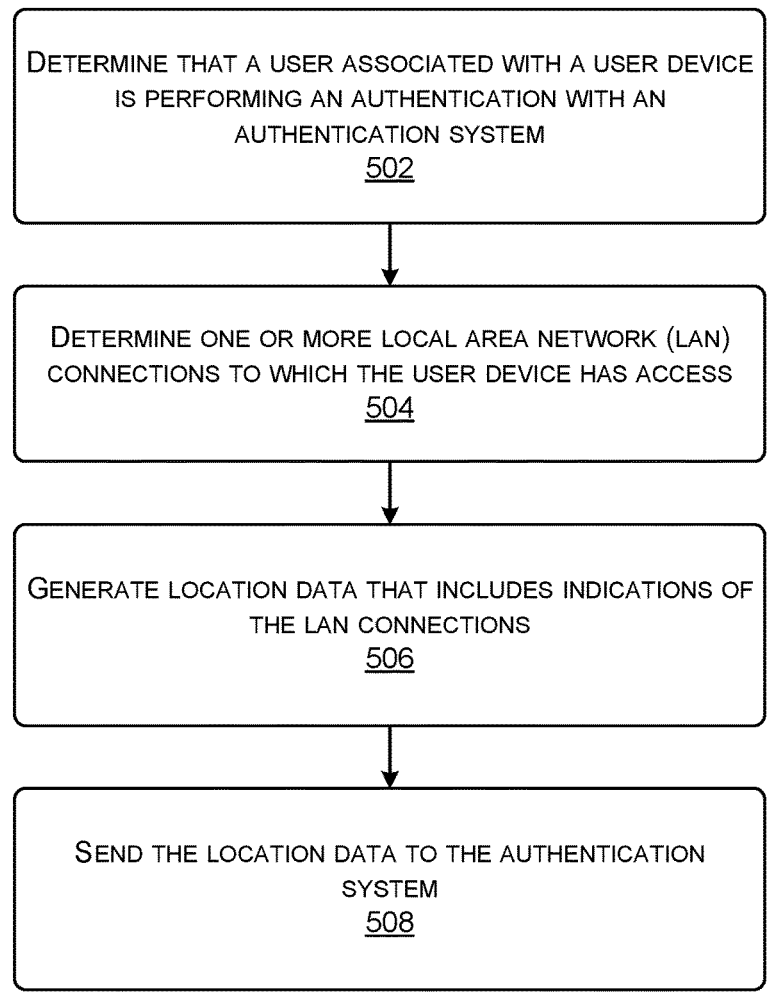
FIG. 5 illustrates a flow diagram of an example method for a user device to authenticate with an authentication system with privacy preserving zero knowledge proof of device co-location.

FIG. 5 illustrates a flow diagram of an example method 500 for a user device to authenticate with an authentication system with privacy preserving zero proof of device co-location. In some instances, the steps of method 500 may be performed by a device (e.g., such as user device 102 and/or authenticator 104) that includes one or more processors and one or more non-transitory computer-readable media storing computer-executable instructions that, when executed by the one or more processors, cause the one or more processors to perform operations of method 500.

At 502, the user device 102 may determine that a user associated with the user device 102 is performing an authentication with an authentication system 122. For instance, the authentication system may correspond to authentication system 122 described above. In some examples, the user device 102 may determine the user is performing an authentication based at least part on the user attempting to access an application 114 or service 116 associated with a remote system 112.

At 504, the user device 102 may determine one or more local area network (LAN) connections to which the user device has access. In some examples, the one or more LAN connections comprises at least one of a BSSID or a MAC address associated with a LAN network.

At 506, the user device 102 may generating location data that includes indications of the one or more LAN connections. In some examples, generating the location data comprises hashing the one or more LAN connections. In some examples, generating the location data comprises generating at least one hash for each of the one or more LAN connections and populating one or more bloom filters with each hash.

Figure 6:
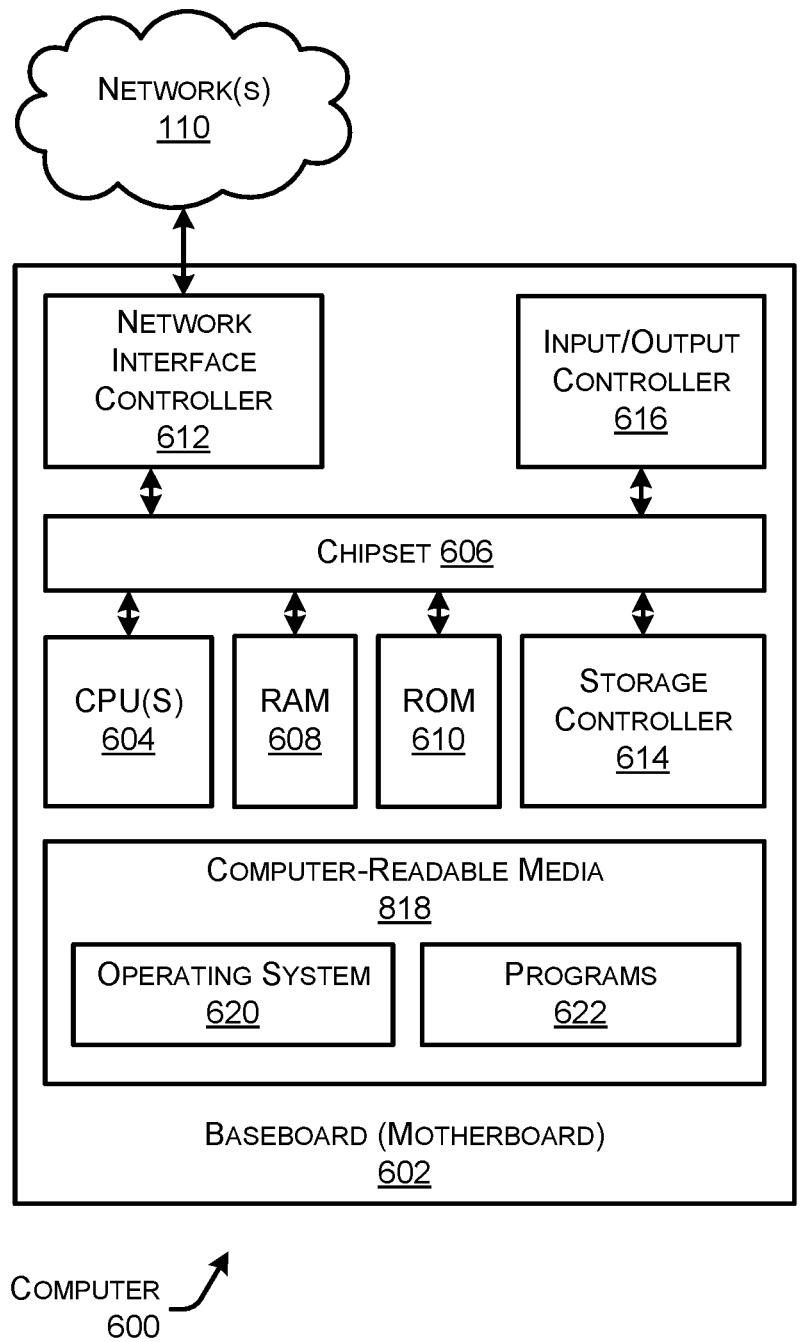
FIG. 6 is a computer architecture diagram showing an illustrative computer hardware architecture for implementing a device that can be utilized to implement aspects of the various technologies presented herein.

At 508, the user device 102 may sending the location data to the authentication system. In some examples and as noted above, the location data may include hashes of the addresses, filter(s), outputs of the filters, encrypted addresses, etc. In some examples, the user device 102 may receive, from the authentication system, a request for a second form of authentication. In some examples, the user device 102 may, based on input from the user, send the second form of authentication to the authentication system. In some examples, second form of authentication may comprise one or more of: a biometric authentication, a password, an image, or a pin FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to an authentication system 122, a user device 102, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network(s) 110. The chipset 606 can include functionality for providing network connectivity through a NIC 612, such as a gigabit Ethernet adapter. The NIC 612 is capable of connecting the computer 600 to other computing de-vices over the local network 108. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the authentication system 122, the user device 102, and/or any components included therein, may be supported by one or more devices similar to computer 600. Stated otherwise, some or all of the operations performed by the authentication system 122, the user device 102, and/or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of an authentication system 122, a user device 102, and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the authentication system 122, the user device 102, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for monitoring and authorizing clock synchronization between devices of a network. For instance, the programs 622 may cause the computer 600 to perform techniques for authenticating a device via an authentication system with privacy preserving zero knowledge proof of device co-location, including: determining that a user device is attempting to authenticate with an authentication system; receiving, from the user device, data indicating a first set of local area network (LAN) connections to which the user device has access; determining a measure of correspondence between the first set of LAN connections and a second set of LAN connections to which the user device had access to at a previous time; and based on determining the measure of correspondence, determining whether the user device is at a same physical location or a different physical location than the user device was at when the second set of LAN connections were received. The programs 622 may additionally or alternatively cause the computer 600 to perform techniques including determining that a user associated with a user device is performing an authentication with an authentication system; determining one or more local area network (LAN) connections to which the user device has access; generating location data that includes indications of the one or more LAN connections; and sending the location data to the authentication system. In this way, the authentication system can more accurately determine a location of a user device and/or a co-located user device. Moreover, the authentication system can more accurately determine that the user device and/or co-located user device is in a same location as previous access attempt(s). Moreover, the techniques described herein enable a user device to identify address(es) of available connection(s) (e.g., such as Bluetooth and wireless) and hash, encrypt, enter each address as input into filter(s), etc. Accordingly, the techniques described herein not only improve determination of user device and/or co-located device(s) locations, but also preventing Push Fraud attacks; thereby improving security of the authentication system, user device; and online service, while also preserving privacy of user data (e.g., by sending already hashed, encrypted, filter(ed) data to the authentication system).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by an authentication system, the method comprising:
    determining that a user device is attempting to authenticate with the authentication system;
    receiving, from the user device, data comprising filtered local area network (LAN) addresses associated with a first set of LAN connections to which the user device has access;
    determining, based on the data, a value indicating an amount of overlap between the first set of LAN connections and a second set of LAN connections the user device had access to at a previous time associated with a previous authentication of the user device; and
    based on determining the value, determining whether the user device is at a same physical location or a different physical location than the user device was at when the second set of LAN connections were received.

2. The method of claim 1, wherein the value is below a threshold, further comprising:
    determining that the user device is at the different physical location; and
    denying authentication of the user device.

3. The method of claim 1, wherein the value is below a threshold, further comprising:
    determining that the user device is at the different physical location; and
    prompting a second user device to perform a second form of authentication.

4. The method of claim 3, wherein the second form of authentication comprises a biometric authentication.

5. The method of claim 1, wherein the data further comprises one or more filters to apply to the data, the one or more filters being associated with generating the filtered LAN addresses.

6. The method of claim 1, wherein the value is above a threshold, further comprising:
    determining that the user device is in the same physical location; and
    granting authentication of the user device.

7. The method of claim 1, wherein the value is above a threshold, further comprising:
    refraining from prompting a user of the user device to perform a second form of authentication.

8. A system comprising:
    one or more processors; and
    one or more non-transitory computer-readable media storing computer-executable instructions that, when executed by the one or more processors, cause the one or more processors to perform operations comprising:
        determining that a user device is attempting to authenticate with an authentication system;
        receiving, from the user device, data comprising filtered local area network (LAN) addresses of a first set of LAN connections to which the user device has access;
        determining, based on the data, a value indicating an amount of overlap between the first set of LAN connections and a second set of LAN connections the user device had access to at a previous time associated with a previous authentication of the user device; and based on determining the value, determining whether the user device is at a same physical location or a different physical location than the user device was at when the second set of LAN connections were received.

9. The system of claim 8, wherein the value is below a threshold, the operations further comprising:
determining that the user device is at the different physical location; and
denying authentication of the user device.

10. The system of claim 8, wherein the value is below a threshold, the operations further comprising:
determining that the user device is at the different physical location; and
prompting a second user device to perform a second form of authentication.

11. The system of claim 10, wherein the second form of authentication comprises a biometric authentication.

12. The system of claim 10, wherein the second user device is different from the user device.

13. The system of claim 8, wherein the value is above a threshold, the operations further comprising:
determining that the user device is in the same physical location; and
granting authentication of the user device.

14. The system of claim 8, wherein the value is above a threshold, the operations further comprising:
refraining from prompting a user of the user device to perform a second form of authentication.

15. A method implemented by a user device, the method comprising:
determining that a user associated with the user device is performing an authentication with an authentication system;
determining one or more local area network (LAN) connections to which the user device has access;
generating location data that includes indications of the one or more LAN connections, the location data comprising an output of populating one or more filters with the one or more LAN connections; and
sending the location data to the authentication system.

16. The method of claim 15, further comprising:
receiving, from the authentication system, a request for a second form of authentication; and
based on receiving input from the user, sending the second form of authentication to the authentication system.

17. The method of claim 16, wherein the second form of authentication comprises one or more of: a biometric authentication, a password, an image, or a pin.

18. The method of claim 15, wherein the one or more LAN connections comprises at least one of a basic service set identifier (BSSID) or a media access control (MAC address) associated with a LAN network.

19. The method of claim 15, wherein generating the location data comprises hashing the one or more LAN connections.

20. The method of claim 15, wherein generating the location data comprises:
generating at least one hash for each of the one or more LAN connections; and
populating the one or more filters with each hash,
wherein the location data the output of the one or more filters.

* * * * *